United States Patent [19]

Soikie et al.

[11] 3,982,300
[45] Sept. 28, 1976

[54] HANGER FOR SMOKE HOUSE

[76] Inventors: Anthony Joseph Soikie, 234 Union St. East, Waterloo, Ontario; Leon Jaskulski, 7 Wareside Road, Etobicoke, Ontario; Knud Erik Hansen, Unit 44, 3525 Brandon Gate Drive, Mississauga, Ontario, all of Canada

[22] Filed: Mar. 18, 1975

[21] Appl. No.: 559,526

[52] U.S. Cl. .................................... 17/44.4
[51] Int. Cl.² ................................. A22C 15/00
[58] Field of Search ............... 17/44.2, 44.3, 44.4

[56] References Cited
UNITED STATES PATENTS 1,596,333  8/1926  Boyle .......................... 17/44.2
3,594,858  7/1971  Simonsen ..................... 17/44.4

*Primary Examiner*—Robert Peshock

[57] ABSTRACT

A support bar for a hanger, in which the bar has a guide rod member extending substantially parallel thereto along all of or at least the major portion of its length, and connecting with catch means at one end of the bar, there being an eye at the other end of the bar, and a hanger with an axially offset slide member which may be slidingly engaged with said guide rod, whereby to support the weight of at least one end of said hanger, while the same is slid along the length of the guide rod, parallel to the support bar and into said catch means, the hanger having suitable engaging means at its other end for interengaging with said eye on the other end of said support bar.

15 Claims, 6 Drawing Figures

FIG. 3

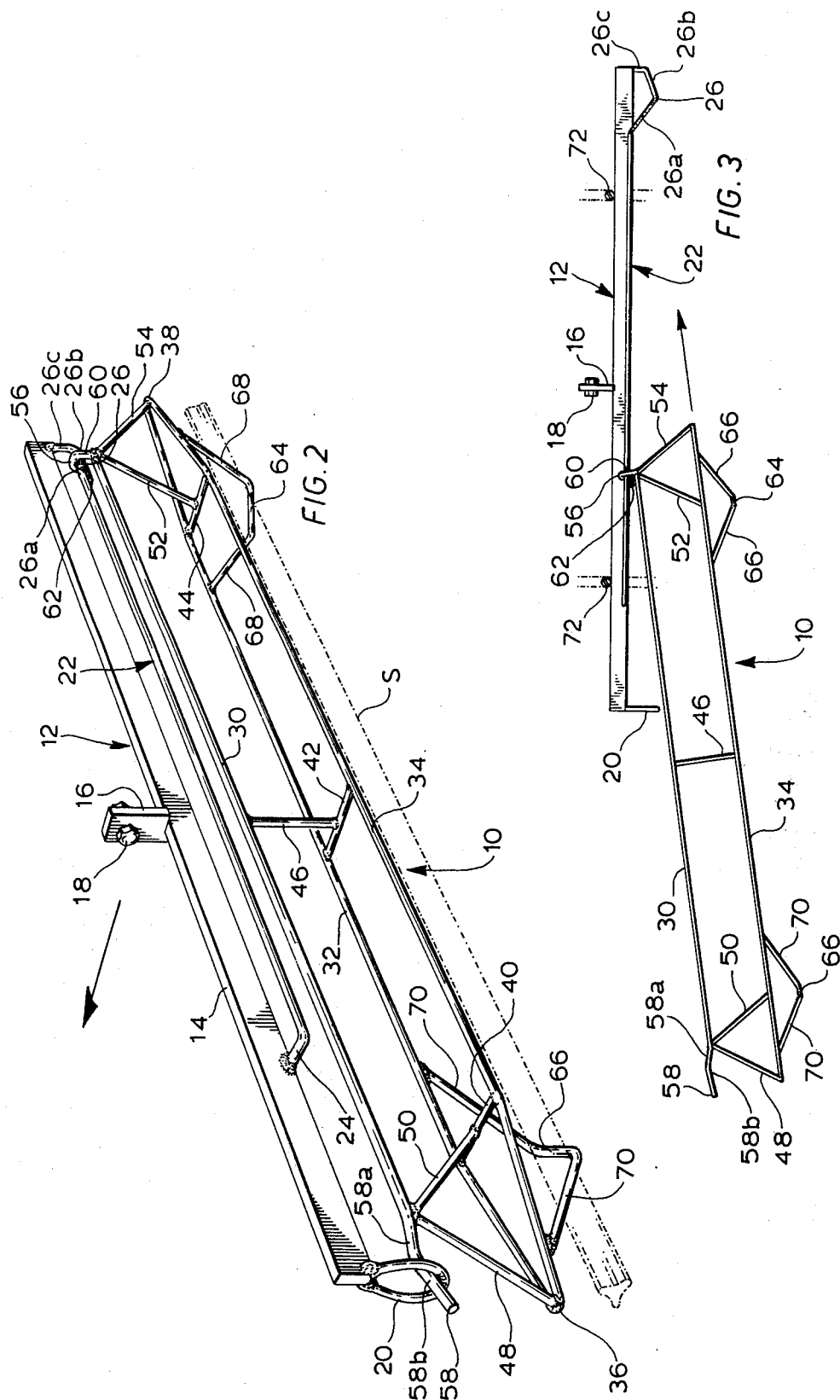

HANGER FOR SMOKE HOUSE

This invention relates to hangers for supporting sausage and other meat products on a conveyor line in a meat curing and smoking installation.

When designing a smoke house, or meat curing installation, and particularly in the case of a smoke house for wieners and frankfurters, it has been found that one of the critical limiting features in the design, is the speed with which the sausages can be loaded from the stuffing machines onto the continuously moving conveyer line.

A length of linked sausages is arranged by hand on a hanger, known as a "stick", and the hanger is then attached to a support bar fastened on a trolley on the overhead conveyer rail. The trolleys move continuously past the load station, where the output ends of the stuffing machines are located. Generally speaking one operator can handle the output of one such stuffing machine, loading the linked sausages onto hangers which are then raised by hand and hooked onto overhead supporting bars attached to the moving conveyer line.

Various different forms of hangers have been provided in the past, and a particularly advantageous and suitable form of hanger is shown in U.S. Pat. Nos. 3,792,508 and 3,594,858. However, in all of such prior hanger systems, the operator had to stand directly beneath the overhead conveyor line when fitting the hanger onto the support bar. This factor made it inconvenient to have more than one operator loading at a time and thus limited the speed with which the hangers could be attached to their individual support bars, and hence limited the volume of meat products which could be processed.

Obviously, it is desirable to provide some system whereby two or more operators can work simultaneously so that two or more stuffing machines can be used at once. In this way, the loading of sausage products onto the conveyor line will be speeded up thereby leading to significant economies in the operating costs of the overall installation.

The smoke house chambers themselves can readily be made longer without greatly increasing the overall cost and the conveyer line can then be speeded up so that the curing time remains the same.

The present invention seeks to overcome the foregoing disadvantages, and to permit the working of four or more operators simultaneously by the provision of a hanger, which may be attached to its supporting bar from one side of the conveyer line rather than from directly underneath. In this way the outputs of four or more sausage stuffing machines may be located to one side of the overhead conveyer line, at the loading station, and four operators can then work, loading simultaneously, without interfering with one another.

More particularly, the invention seeks to provide a support bar for a hanger, in which the bar has a guide rod member extending substantially parallel thereto along all of or at least the major portion of its length, and connecting with catch means at one end of the bar, there being an eye at the other end of the bar, and by providing the hanger with an axially offset slide member which may be slidingly engaged with said guide rod, whereby to support the weight of at least one end of said hanger, while the same is slid along the length of the guide rod, parallel to the support bar and into said catch means, the hanger having suitable engaging means at its other end for interengaging with said eye on the other end of said support bar.

More particularly, the invention seeks to provide, in one embodiment of the invention, a hanger having a hook at one end, forming said slide member, which may be interengaged with said catch means, and the engaging means at the other end of the hanger being releasably engageable with said eye, whereby at an unloading station, said engaging means may be released from said eye, leaving said hanger to swing freely from said hook.

It is a further and related objective of the invention to provide, in an alternate embodiment, a hanger having a slide pin forming said slide member at one end of said hanger which may be slid along said guide rod and engaged in said catch means, and having a hook at its other end, forming said engaging means for interengaging with said eye. At a suitable unloading station, the slide pin may be released from the catch means, leaving the hanger to swing by the hook from said eye. In this way, the two embodiments of the invention provide for unloading of said hangers at an unloading station either to the left or to the right.

It is a further and related objective of the invention to provide a hanger having the foregoing advantages which is additionally provided with downwardly dependent stick support means, by means of which conventional smoke house sticks may be loaded with other meat products such as bologna sausage or any other meat products which may be carried through the smoke house for curing or smoking, such support means being characterised by an absence of any free ends which might interfere with the free movement of sausage products on the hangers themselves.

The various features of novelty which characterise the invention are pointed out with particularity in the claims annexed to and forming a part of this disclosure. For a better understanding of the invention, its operating advantages and specific objectives obtained by its use, reference should be had to the accompanying drawings and descriptive matter in which there are illustrated and described preferred embodiments of the invention.

FIG. 2 is a perspective illustration of a hanger and support bar according to one embodiment of the invention;

FIG. 3 is a side elevational view of the embodiment of FIG. 2, showing the hanger in the stage of being attached to the support bar;

Figure 1:
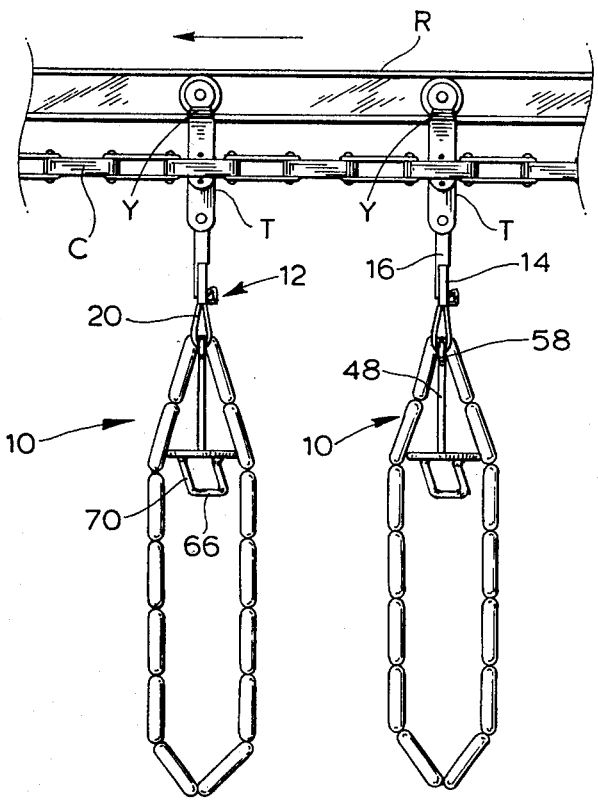
FIG. 1 illustrates a partial side elevational view of a typical conveyer system for use in smoke houses and curing installations.

Referring now to FIG. 1, the hanger according to the invention is shown generally by the reference arrow 10, and the support bar for the hanger is shown by the general reference arrow 12.

The support bar 12 will be seen to be connected to a conventional trolley T consisting essentially of an inverted Y-shaped yoke, and wheels running on the lower portion of a conveyer rail R. The trolleys are connected together in predetermined spaced relation by means of a linked chain C. Such conveyer rails, trolleys and chains are conventional and well known in the art and require no further description.

The rail R may be horizontal, and preferably in the area of the loading station itself will be low enough so that operators loading the hangers may stand erect, to one side of the rail R, and then may simply reach across beneath the support bars moving along that portion of the rail R, when loading the hangers onto the support bars. In this way their work is greatly facilitated.

Figure 4:
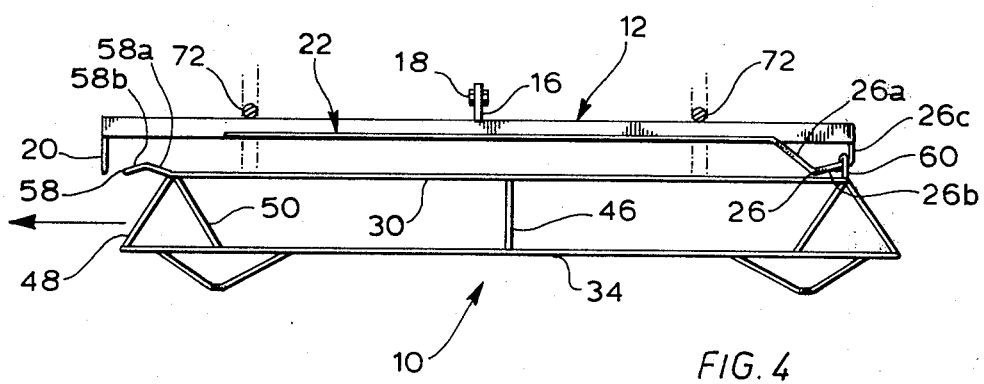
FIG. 4 is a side elevational view corresponding to FIG. 3, showing the hanger bar at a further stage during its attachment.

Referring now to FIGS. 2, 3 and 4 the support bar 12 will be seen to comprise a solid heavy rectangular metal bar 14 having a central support stem 16 welded to the central portion thereof, the stem 16 being provided with any suitable mean such as the bolt 18 for attachment to the trolley T. At one end of the bar 14 there is provided a closed eye or loop 20 depending substantially vertically downwardly from the free end of the bar 14.

A guide rail 22 is provided extending essentially parallel to and spaced from the bar 14. At one end the guide rod 22 is attached to the bar 14 by the L-shaped end portion 24. The end portion 24 is shown located close to the eye 20. It can of course be located closer to the eye 20 or further from it depending upon the design of the particular smoke house, and the loads intended to be carried.

At the other end of the guide rod 22, there is provided the catch 26, formed integrally with the guide rod 22 of the same material by bending the guide rod 22 into a predetermined configuration. The catch 26 will be seen to be comprised of two V-shaped portions 26a and 26b, with the apex of the V directed downwardly. The end portion 26C of the catch 26 is bent substantially vertically upwardly and welded to the underside of the bar 14 at the free end thereof opposite to the eye 20.

Preferably, since the guide rod 22 is offset to one side of the bar 14, the catch 26 will be formed in such a way that the apex of the V is located directly beneath the bar 14. For this purpose, the portion 26a is preferably angled both downwardly, and also diagonally beneath the bar 14, and the portion 26b will be located substantially in a vertical plane intersecting the bar 14. In this way, the hanger 10 when positioned on the bar 14, will be located substantially in alignment therewith.

The hanger 10 will be seen to comprise an upper support rail 30 and a pair of lower spaced apart spacer rails 32 and 34. The rails 32 and 34 are parallel to one another, along the major portion of their length, but at each end, are tapered inwardly into a V-shape, meeting at the apex of the V shown as 36 and 38 at each end of the hanger 10. Cross bars 40, 42 and 44 extend between the spacer rails 32 and 34 in parallel spaced apart locations as shown.

The support rail 30 is connected to the spacer rails 32 and 34 by means of a central vertical rod 46 extending downwardly from the central portion of support rod 30, and connecting with the mid-point of the cross member 42. Further connection is made by the angled connector rods 48, 50 and 52, 54. The rods 48 and 54 connect between the ends of the upper spacer rail 30 and the apex 36 and 38 respectively of the spacer rails 32 and 34. Connector rods 50 and 52 respectively connect with cross members 40 and 44.

In this way a light-weight strong hanger may be manufactured of suitable material such as stainless steel. Preferably, the spacer rails 32 and 34 are located at a distance from the upper support rail 30 equal to about the length of a typical sausage product. In this way, the loader when arranging a string of sausages on the hanger, can ensure that contact between the upper support rail 30 and the sausages is confined to the area of skin joining the linked sausages, and does not actually affect the shape of the sausages themselves. Similarly, contact between sausages and rail 32 or 34 will again take place in the ideal condition, in areas of skin linking two sausages. In this way, the shape of the sausages will not be affected or harmed during curing. Obviously, this is not going to be possible in every case since different sizes of sausages may be manufactured, and it will not usually be practicable for the owner of a curing installation to arrange for sufficient supply of separate hangers for different sizes of sausages. However, even when the sausages do not precisely match the dimensions of the hanger 10, still nonetheless the engagement between the sausages and the spacer rails 32 and 34 will only be such as to cause a slight bend in the shape of the sausage.

In order to attach the hanger 10 to the support bar 12, the hanger 10 is provided with a slideable engaging member, in this case the hook 56 fastened at one end of the support rail 30. At the other end of the support rail a further engaging member, in the form of the pin 58 is provided. The hook 56 is made with a substantially vertical upstanding stem portion 60 extending between the support rail 30 and the rounded hook 56. At the free end of the hook 56 there is provided a stub portion 62 extending, in this case, substantially parallel to the axis of the support rail 30, and directed towards the opposite end thereof.

At the opposite end of the support rail 30, the pin 58 is formed of an endwise extension of the rail 30 integrally therewith. The pin 58 comprises an upwardly angled portion 58a and a downwardly angled portion 58b. The two portions make an inverted V, so that the apex of the V will rest snugly on the loop or eye 20.

In order to provide greater versatility in the use of the hanger 10, downwardly dependant support means are provided on the hanger 10 by means of which a conventional smoke house stick may be attached to the hanger 10 so as to carry other forms of meat products such as bologna, or other meat sections which may be smoked or cured. Such downwardly dependent support means will be seen to comprise, in this embodiment of the invention, the two diagonal horizontal rod members 64 and 66, located below the spacer rail 32 and 34. The rods 64 and 66 are themselves connected to the spacer rails 32 and 34 by means of the upwardly angled connecting portions 68—68 and 70—70 . It will be appreciated that the members 64 and 68, are formed integrally of a single piece of rod stock, and similarly the members 66 and 70 are formed integrally of a single piece of rod stock, the two ends of which are both securely welded to respective spacer rails 32 and 34. A conventional smoke house stick, shown in phantom as S in FIG. 2, can readily be interengaged with the members 64 and 66 by simply sliding one end of the stick over one support and then swinging the other end of the stick over the other support and centering the stick with respect to the hanger. At the same time, since both ends of the rods are attached there is no possibility that they will become entangled with the more conventional sausage products when the hanger is used without the smoke stick.

If one side 12a of the hanger bar 12 is regarded as the leading side, the other side 12b will be the trailing side. When suspended on the trolleys T and being moved by chain C the leading side 12a will face in the direction of travel. The guide rod 22 will thus be seen to be located on the trailing side 12b and faces rearwardly i.e. away from the direction of travel.

In operation, the conveyer line will be continuously moving, and empty hangers will arrive at the loading station hanging by the hook 56 linked in the catch 26. The pin 58 will not be located in the eye 20, the pin 58 having been displaced from the eye 20 at an unloading station (described in the earlier patents referred to herein).

The operator will then lift one of the hangers 10 off its catch 26, and will introduce it into a string of linked sausages, arranging the sausages as described above so that the upper support rail 30 engages the portions of skin between the sausages, with loops of sausages hanging downwardly around the spacer rails 32 and 34. The operator will then raise the loaded hanger 10, and while standing to one side of the rail R, will place the hook 56 over the guide rod 22, at or close to the L-shaped end 24. He will then push the hanger 10 so that the hook 56 slides long the guide rod 22, and then drops down the downwardly angled portion 26a until it stops at the apex of the V 26. He will then push the hanger slightly further until the hook 56 rises up the upwardly angled portion 26b, at which time the pin 58 will then just be clear to be swung into alignment with the eye 20. He will then slide the hanger back towards himself again introducing the pin 58 into the eye 20, so that the apex of the V in the pin 58 rests on the eye 20. In this position, the hook 56 will be resting in the apex of the V formed by catch 26. It will thus be stable and cannot be accidentally dislodged during movement through the smoke house. All of these operations can be carried out to one side of the conveyer line, since a large portion of the weight of the loaded hanger is carried on the hook 56, and once the hook 56 has been engaged on the guide rod 22, the loader merely has to hold the other end either at the apex 36 or at the pin 58.

At the unloading station, the unloading of the hangers 10 is effected essentially in the same manner as described in the earlier patents referred to above. The pin 58 or apex 36, by suitable abutment means is pressed axially so that the pin slides out of the eye 20, and the hanger 10 will then swing downwardly, with the hook 56 engaged in the catch 26. This will of course release the cooked and smoked sausages and they will drop into a suitable container.

In order to stabilize the position of the support bar 12 during loading and unloading, guide members 72 are provided on either side of the conveyer rail R, to engage the upper surface of the horizontal bar 14, and prevent it from swinging from side to side during the loading and unloading operation.

In the case where the hangers 10 are used for other forms of smoked or cured meat products such as bologna, then the hangers 10 will normally be already positioned on their support bars 12 in the position as shown in FIG. 2. All the operator does in this case is to simply pick up a conventional smoke house stick from a suitable bin or container, and then arrange the various meat products on it. In the majority of cases, such other forms of meat products such as bologna will be contained in larger sausage skins tied up with strings and there will usually be a string loop at the top. The operator will simply introduce the smoke house stick into the loops of a suitable number of such sausages or other meat products and will then raise the stick into position, sliding it first over one support rod 64, and then sliding it the other way over the other support rod 66 and centering it with respect to the hanger.

Similarly, unloading of such other forms of meat products will normally be carried out by hand, although conceivably similar forms of automatic unloading can be provided as described in the earlier patents referred to.

It will of course be appreciated that when using the embodiment of FIGS. 2, 3 and 4, the loading and unloading of the hangers 2, when operating with conventional sausage products, will have to take place from the left hand end, that is to say the end corresponding to the pin 58.

In certain cases, where an installation has already been put in for an automatic unloading station in a smoke house, it may be that the automatic unloading station has already been positioned on the right hand side, and in that case it would not be possible to use the hangers shown in FIGS. 2, 3 and 4, since they require an unloader which will engage the pin 58 which is on the left hand end of the hanger.

Figure 5:
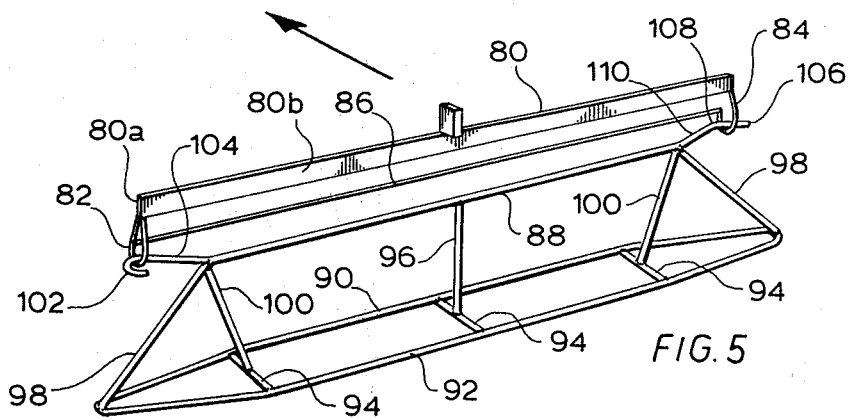
FIG. 5 is a perspective illustration of an alternate embodiment.
Figure 6:
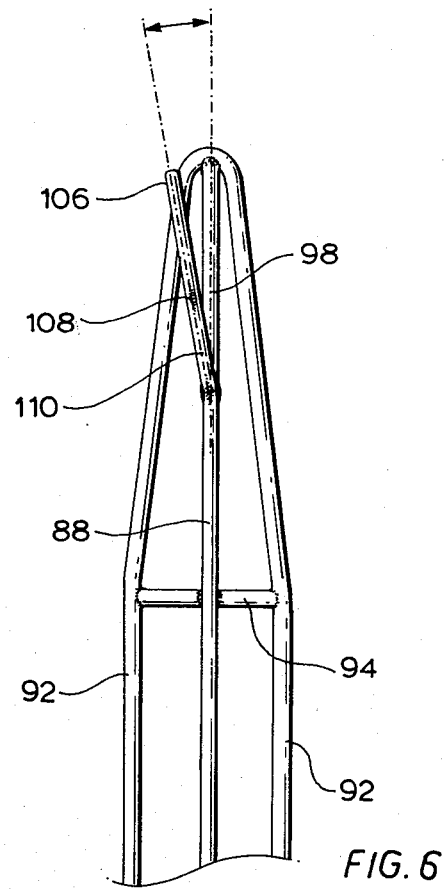
FIG. 6 is a top plan view of a portion of FIG. 5.

Accordingly, according to the further embodiment of the invention as illustrated in FIGS. 5 and 6, provision may be made, according to the invention, for a slightly modified form of hanger and support bar which may be loaded from the left hand side, as in the case of the embodiments of FIGS. 2, 3 and 4, but which will be automatically unloaded from the right hand side.

In this further embodiment, the hanger bar 80 is provided with a closed eye 82 at one end, and an open eye 84 at the other end. Extending between the closed and the open eye is a guide rod 86. The open eye will be seen to comprise a hook shape, with the tip of the guide rod 86 attached to the eye 84 at the free end of the hook. The other end of the guide rod 86 is attached to the closed eye 82, at a similar point, so that the guide rod 86 is essentially parallel to the hanger bar 80. If one side of the hanger 80 namely side 80a is regarded as the leading side and side 80b is regarded as the trailing side, then the guide rod 86 is located beyond the leading side 80a of the hanger. In this way, when the hangers are hanging from the trolleys T, and are being moved by the chains C, the guide rods 86 will always be slightly in advance of the hanger bars 80 themselves. The hangers 80 are attached to the trolleys by any suitable supporting stem (not shown).

The hangers in accordance with this alternate embodiment are similar to one form of hanger shown in the earlier patents referred to, and will be seen to comprise an upper support rail 88, lower support rails 90 and 92, cross members 94, and connector members 96 and 98 and 100, similar to the construction of the hangers 10 in the embodiments of FIGS. 2, 3 and 4.

However in this embodiment, at one end of the upper support rail 88, a hook member 102 is provided, located on the free end of an upwardly angled stem portion 104. At the other end of the support rail 88 there is provided a slideable engaging member in the form of the pin 106 formed with a bend 108 and an upwardly angled portion 110. The upwardly angled portion 110 and pin 106 are bent out of alignment with the upper support rail 88 when viewed in a vertical plane so that they are offset by an angle of between about 5° and 10°. The offsetting or angling of the portion 110 and pin 106 is in the "forward" direction i.e. in the direction of travel, when the hangers are attached to their support bars.

In operation, the hangers will arrive at the loading station suspended from the left hand closed eye 82 by means of the hook 102, having been unloaded at the unloading station from the right hand side.

The operator will then lift a hanger off its eye 82, and arrange a string of sausages on it in the manner described above and will then be standing slightly to the left of the conveyer rail R. He will raise the loaded hanger upwardly, and swing it at a slight angle so as to point the pin 106 towards the left hand end of the guide rod 86, that is to say the end closest to the eye 82. He will then place the pin 106 over the guide rod 86 and slide it along to the right hand end of the guide rod 86 at which point it will drop downwardly into the open eye 84. He will then be holding the left hand end of the hanger, and he will simply slide the pin 106 somewhat further into the eye 84, at which point the hook 102 will clear the eye 82 and he will then swing the hook 102 into the eye 82 and release his grip.

Due to the upwardly angled stem 104 and the upwardly angled portion 110, the hanger will then hang centrally on the two eyes, and will not become dislodged until such time as it reaches the unloading station.

At the unloading station, it will receive pressure from the right hand end which will cause the hanger to move so that the upwardly angled portion 104 slides through the eye 82 at which point pin 106 will then be released from the eye 84 and the hanger will swing downwardly releasing its load of sausages, and remain hanging by the hook 102 from the eye 82.

It will be understood that reference to right and left hand ends or sides is purely by way of example, for the purpose of distinguishing one from the other. Clearly the embodiment of FIGS. 2, 3 and 4 may be made the opposite way around so that it is loaded and unloaded from the right.

Similarly the embodiment of FIGS. 5 and 6 may be made so that it is loaded from the right and unloaded from the left.

The difference between the two embodiments is that whereas one is loaded and unloaded from the same end, the other embodiment is loaded from one end and unloaded from the other.

The foregoing description of a preferred embodiment of the invention is given here by way of example only. the invention is not to be taken as limited to any of the specific features as described, but comprehends all such variations as come within the scope of the appended claims.

What is claimed is:

1. Support bar apparatus for use in a side-loading hanger system for supporting meat products such as sausages and the like on a moving conveyor system, during curing, said apparatus comprising;
    a support bar adapted for attachment to said conveyor system, said bar defining two ends;
    eye means at one said end of said bar;
    catch means at the other said end of said bar, and,
    guide rod means located substantially alongside but spaced from said support bar, said guide rod means having two ends, one said end being attached to said catch means and the other said end to said support bar.

2. A support bar as claimed in claim 1 wherein said catch means is in the form of a downwardly dependent hook having a free end, said guide rod means being attached to said free end.

3. A support bar as claimed in claim 2 wherein said hook is directed along an axis extending outwardly from the axis of the guide rod, and making a slight angle thereto, and includes a V-shaped portion defining an upwardly angled ramp at either side thereof.

4. A support bar as claimed in claim 2 wherein said hook is of generally curved shape, and is located in a plane rotated at approximately 90° to the axis of the guide rod.

5. A support bar as claimed in claim 4 wherein said guide rod means extends from the free end of said hook, to said eye means, and is located approximately parallel with said support bar but spaced downwardly and to one side thereof.

6. A support bar as claimed in claim 1 wherein said guide rod means and said catch means are formed of a continuous piece of metal rod, one said end of said rod being welded to said support bar adjacent to the end of said bar having said eye means, and said rod at its other said end being bent into a V-shape, and the free end of the V being bent directly upwardly and welded to the other said end of said support bar.

7. A hanger for use in conjunction with a support bar forming part of a side-loading hanger apparatus for supporting meat products such as sausages and the like on a moving conveyor system, during curing, said hanger comprising;
    an upper support rail;
    a pair of lower spaced apart spacer rails;
    connecting means connecting between said upper support rail and said lower support rails and securing the same in their predetermined spaced apart relation;
    hook means at one end of said upper support rail, and,
    centering pin means at the other end of said upper support rail, said pin means having an upwardly angled portion and a free end portion which is angled slightly downwardly with respect to the axis of the upper support rail said two angled portions meeting at an apex.

8. A hanger as claimed in claim 7 wherein said lower spacer rails are longer than said upper support rail, and are parallel along most of their length, and are angled inwardly towards one another at their ends, with their ends merging with one another, and including a plurality of cross bars extending between said lower spacer rails, and connecting rods extending between said upper support rail and some of said cross bars, and further connecting rods extending between said upper support rail and the ends of said lower spacer rails.

9. A hanger as claimed in claim 7 including downwardly dependent support means located below said lower spacer rails, each of said support means being in the form of a continuous piece of metal rod, with both ends welded to said lower spacer rails, and an intermediate portion bent downwardly therefrom, the two ends of said rod being spaced apart from one another lengthwise along said spacer rails whereby to avoid entanglement with meat products carried on said hanger.

10. A hanger system for supporting meat products such as sausages and the like on a moving conveyor system, during curing and the like, wherein said meat products are supported on a hanger, which is in turn supported on a support bar connected to said moving conveyor, said hanger system comprising;

a support bar adapted for attachment to said conveyor, said bar defining two ends;
eye means at one said end of said bar;
catch means at the other said end of said bar;
guide rod means located alongside but spaced from said support bar, said guide rod means having two ends, one said end being attached to said catch means and the other said end to said support bar;
a hanger for attachment on said support bar and having an upper support rail, a pair of lower spaced apart spacer rails and connecting means connecting between said upper support rail and said lower spacer rails;
hook means at one end of said upper support rail shaped to fit over said guide rod means, and,
pin means at the other end of said upper support rail for interengagement with said eye means, said pin means having a free end which is angled slightly downwardly with respect to the axis of said upper support rail.

11. A hanger system as claimed in claim 10 wherein said catch means is in the form of a downwardly dependent hook having a free end, said guide rod means being attached to said free end.

12. A hanger system as claimed in claim 11 wherein said hook is directed along an axis extending outwardly from the axis of the guide rod, and making a slight angle thereto, and includes a V-shaped portion defining an upwardly angled ramp at either side thereof.

13. A hanger system as claimed in claim 11 wherein said hook is of generally curved shape, and is located in a plane rotated at approximately 90° to the axis of the guide rod.

14. A hanger system as claimed in claim 13 wherein said guide rod means extends from the free end of said hook, to said eye means, and is located approximately parallel with said support bar but spaced downwardly and to one side thereof.

15. A hanger system as claimed in claim 10 wherein said guide rod means and said catch means are formed of a continuous piece of metal rod, one said end of said rod being welded to said support bar adjacent to the end of said bar having said eye means, and said rod at its other said end being bent into a V-shape, and the free end of the V being bent directly upwardly and welded to the other said end of said support bar.

* * * * *